(12) United States Patent
Prüssmeier

(10) Patent No.: US 9,997,985 B2
(45) Date of Patent: Jun. 12, 2018

(54) STATOR DEVICE FOR A LINEAR MOTOR, AND LINEAR TRANSPORT SYSTEM

(71) Applicant: Beckhoff Automation GmbH, Verl (DE)

(72) Inventor: Uwe Prüssmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 693 days.

(21) Appl. No.: 14/497,557

(22) Filed: Sep. 26, 2014

(65) Prior Publication Data

US 2015/0048693 A1 Feb. 19, 2015

Related U.S. Application Data

(63) Continuation of application No. PCT/EP2013/055851, filed on Mar. 20, 2013.

(30) Foreign Application Priority Data

Mar. 27, 2012 (DE) .......................... 10 2012 204 916

(51) Int. Cl.
*H02K 41/02* (2006.01)
*B65G 54/02* (2006.01)
(Continued)

(52) U.S. Cl.
CPC ............. *H02K 41/02* (2013.01); *B65G 54/02* (2013.01); *H02K 3/28* (2013.01); *H02K 11/215* (2016.01);
(Continued)

(58) Field of Classification Search
CPC .......... H02K 3/28; H02K 41/03; H02K 41/02; H02K 41/031; H02K 11/33; H02K 11/215;
(Continued)

(56) References Cited

U.S. PATENT DOCUMENTS 5,134,324 A 7/1992 Sakagami et al.
5,701,042 A 12/1997 Takei
(Continued)

FOREIGN PATENT DOCUMENTS

AT 509101 A1 6/2011
CN 1295000 A 5/2001
(Continued)

OTHER PUBLICATIONS

First Chinese Office Action for Chinese Patent Application No. 201380017399.8, dated May 10, 2016 (7 pages).
(Continued)

*Primary Examiner* — Naishadh Desai
(74) *Attorney, Agent, or Firm* — Dorsey & Whitney LLP

(57) ABSTRACT

A stator device for a linear motor comprises an electrically energizable magnetic field generator for forming a magnetic field, and a first holding device for holding the magnetic field generator, wherein the magnetic field generator is fastened to the first holding device, wherein the first holding device is formed at least partially from an any of an electrically and magnetically non-conductive material, wherein the magnetic field generator comprises a coil and a stator tooth as a core around which the coil is wound, and wherein the first holding device is in the form of a printed circuit board for electrical contacting of the magnetic field generator.

15 Claims, 14 Drawing Sheets

(51) Int. Cl.
  *H02K 41/03* (2006.01)
  *H02K 3/28* (2006.01)
  *H02K 11/215* (2016.01)
  *H02K 11/33* (2016.01)
  B60L 13/03 (2006.01)
  H02K 1/27 (2006.01)
  H02K 7/08 (2006.01)

(52) U.S. Cl.
  CPC ............ *H02K 11/33* (2016.01); *H02K 41/03* (2013.01); *H02K 41/031* (2013.01); *B60L 13/03* (2013.01); *H02K 1/27* (2013.01); *H02K 7/08* (2013.01)

(58) Field of Classification Search
  CPC . H02K 7/08; H02K 1/27; B65G 54/02; B60L 13/03
  See application file for complete search history.

(56) References Cited

U.S. PATENT DOCUMENTS

| | | | |
|---|---|---|---|
| 5,841,208 A | 11/1998 | Abe | |
| 6,011,389 A * | 1/2000 | Masreliez | G01D 5/2046 324/207.17 |
| 6,191,507 B1 | 2/2001 | Peltier et al. | |
| 6,611,138 B2 | 8/2003 | Vasiloiu | |
| 6,664,665 B2 | 12/2003 | Hsiao | |
| 6,781,524 B1 | 8/2004 | Clark et al. | |
| 6,876,107 B2 | 4/2005 | Jacobs | |
| 6,920,699 B2 | 7/2005 | Reusing et al. | |
| 7,170,241 B1 | 1/2007 | Faizullabhoy et al. | |
| 2002/0049553 A1 | 4/2002 | Schmid et al. | |
| 2002/0104716 A1 | 8/2002 | Zaharia | |
| 2003/0230941 A1* | 12/2003 | Jacobs | B60L 15/38 310/12.19 |
| 2004/0163270 A1 | 8/2004 | Reusing et al. | |
| 2005/0173991 A1* | 8/2005 | Watarai | H02K 41/03 310/12.25 |
| 2006/0001518 A1 | 1/2006 | Hayashi et al. | |
| 2008/0036305 A1 | 2/2008 | Raos | |
| 2008/0265691 A1 | 10/2008 | Shikayama et al. | |
| 2009/0230785 A1* | 9/2009 | Ida | H02K 41/03 310/12.31 |
| 2010/0253170 A1* | 10/2010 | Bi | H02K 1/148 310/156.01 |
| 2011/0278958 A1 | 11/2011 | Kawakami | |
| 2012/0223724 A1 | 9/2012 | Vasiloiu et al. | |
| 2013/0181547 A1 | 7/2013 | Nishifukumoto et al. | |
| 2013/0270928 A1 | 10/2013 | Nord | |
| 2015/0008768 A1 | 1/2015 | Achterberg et al. | |
| 2015/0048817 A1 | 2/2015 | Prussmeier | |
| 2015/0137625 A1 | 5/2015 | Achterberg et al. | |

FOREIGN PATENT DOCUMENTS

| | | |
|---|---|---|
| CN | 1933304 A | 3/2007 |
| CN | 1954477 A | 4/2007 |
| CN | 101292412 A | 10/2008 |
| CN | 100592609 C | 2/2010 |
| CN | 102255470 A | 11/2011 |
| DE | 69003365 T2 | 2/1994 |
| DE | 10138164 A1 | 2/2003 |
| DE | 10300918 A1 | 7/2004 |
| DE | 102004057205 A1 | 6/2005 |
| DE | 102004050337 B3 | 2/2006 |
| EP | 1164358 B1 | 8/2005 |
| EP | 1758231 A1 | 2/2007 |
| JP | H02264306 A | 10/1990 |
| JP | 04210771 A | 7/1992 |
| JP | 06165475 A | 6/1994 |
| JP | 10066327 A | 3/1998 |
| JP | H11173872 A | 7/1999 |
| JP | 2000014119 A | 1/2000 |
| JP | 2000055647 A | 2/2000 |
| JP | 2000324789 A | 11/2000 |
| JP | 2003247861 A | 9/2003 |
| JP | 2007288967 | 11/2007 |
| JP | 2010074977 A | 4/2010 |
| JP | 2011097750 A | 5/2011 |
| WO | 96/27544 | 9/1996 |
| WO | 2011/129773 A1 | 10/2011 |
| WO | 2013143728 A2 | 10/2013 |
| WO | 2013143783 A1 | 10/2013 |
| WO | 2013143950 A2 | 10/2013 |

OTHER PUBLICATIONS

First Office Action for related Chinese patent application No. 2013800175368 (4 pages).
First Chinese Office Action for Chinese Patent Application No. 201380022569.1, dated Mar. 21, 2016 (7 pages).

* cited by examiner

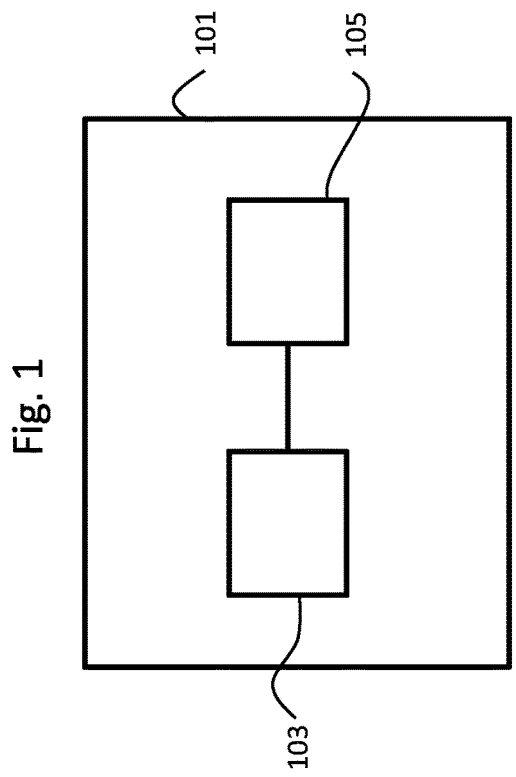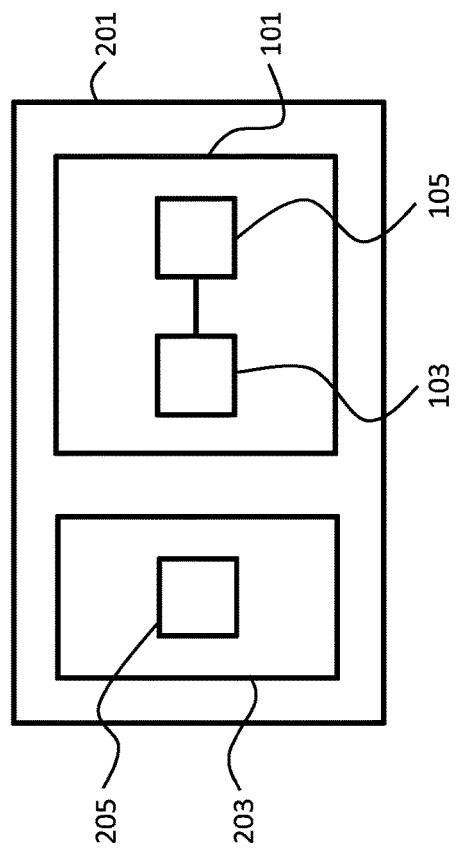

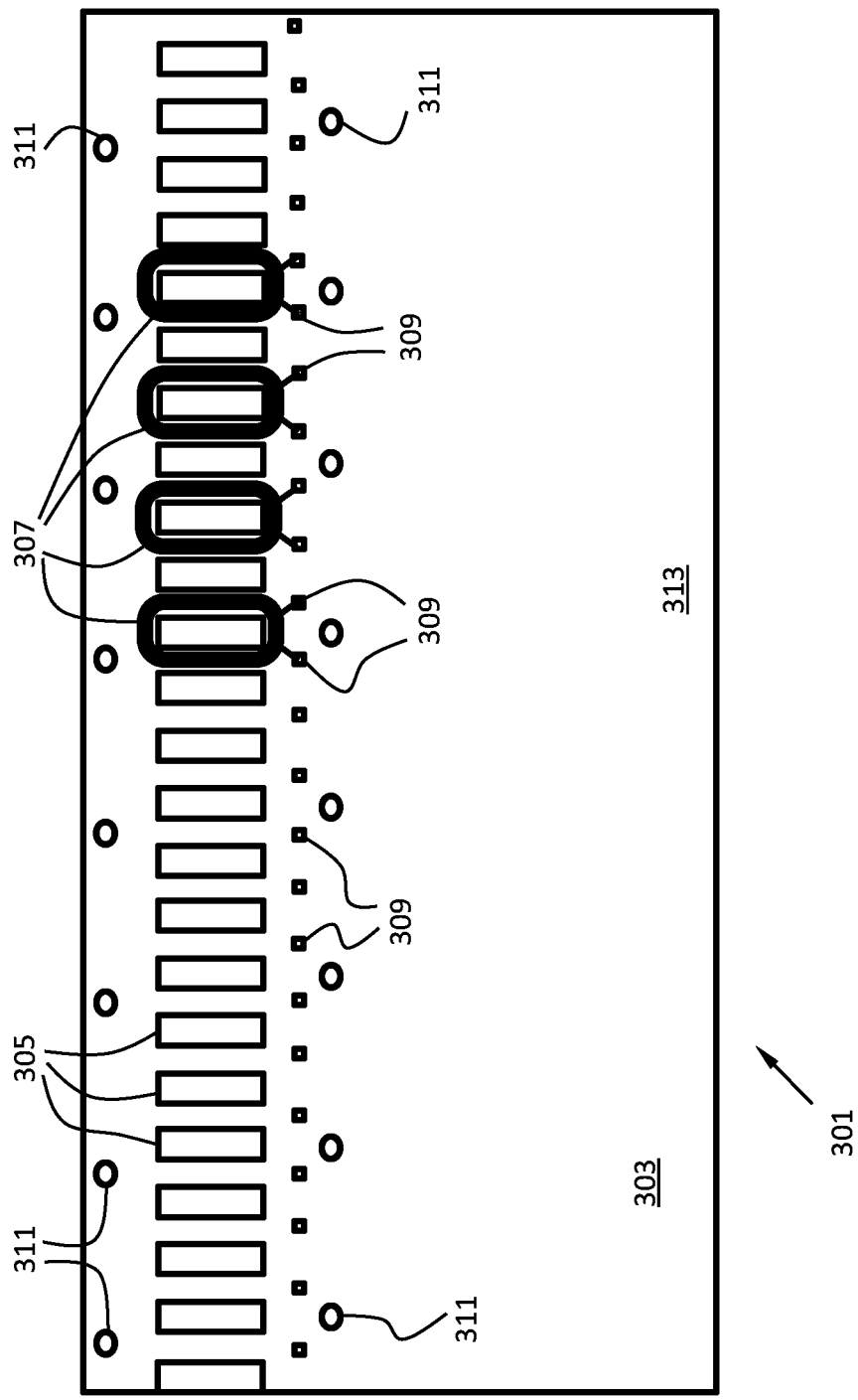

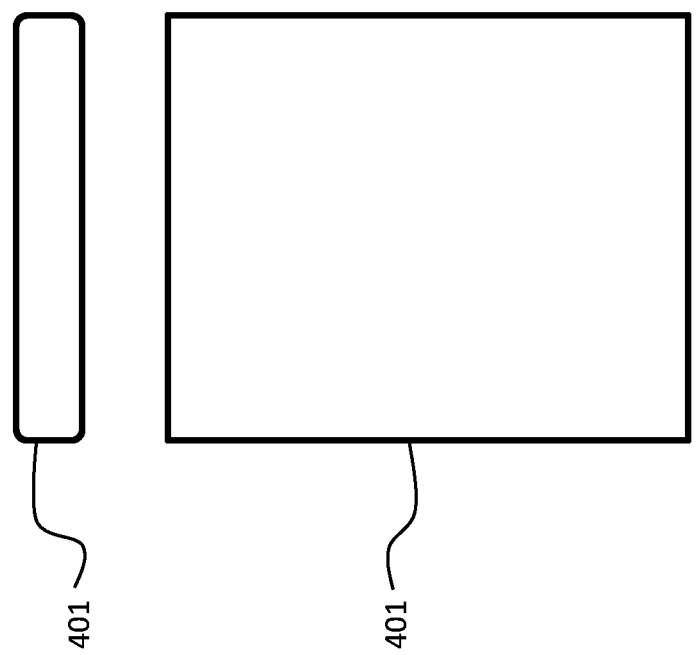

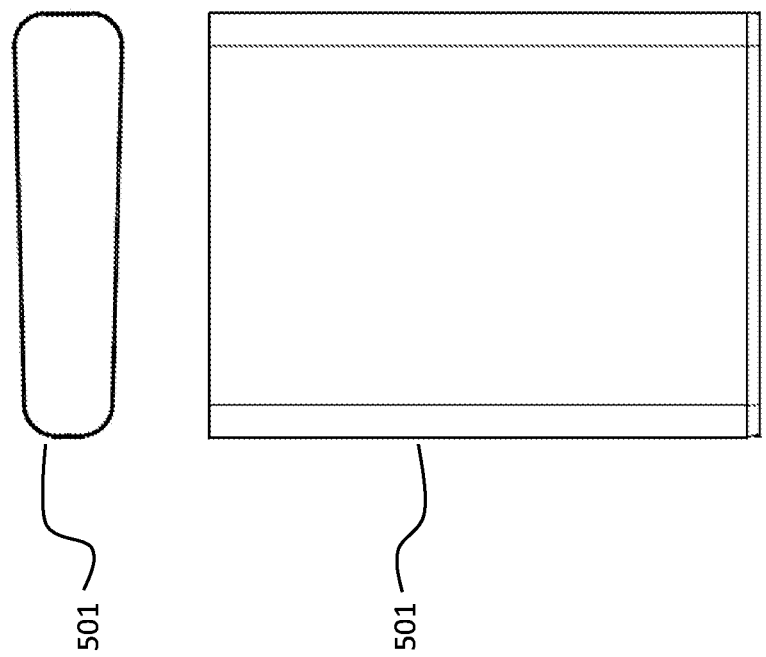

STATOR DEVICE FOR A LINEAR MOTOR, AND LINEAR TRANSPORT SYSTEM

CROSS-REFERENCE TO RELATED APPLICATIONS

This application is a continuation of International Patent Application No. PCT/EP2013/055851, filed on Mar. 20, 2013, which claims priority to German Patent Application No. DE 10 2012 204 916.9, filed on Mar. 27, 2012, each of which is incorporated by reference herein, in the entirety and for all purposes.

FIELD

The present invention relates to a stator device for a linear motor. The present invention also relates to a linear transport system.

BACKGROUND

WO 96/27544 discloses a device for transporting products between different stations. Here, a carriage is provided which has a U-shaped yoke, wherein permanent magnets are formed on the inner sides of the yoke. Within the yoke there are arranged multiple air-core coils which are seated on a support plate. When the air-core coils are electrically energized, a magnetic field forms, which magnetic field interacts with the magnetic field of the permanent magnets of the yoke such that the carriage is subjected to a translatory movement. The air-core coils form an air gap between the permanent magnets. Said gap must be kept small in order to achieve a good action of force. The mechanical strength opposes this and does not permit good strength. The mechanical guide cannot be combined with the coil arrangement in this way. Furthermore, air-core coils have the disadvantage of high magnetic leakage losses, in particular in the case of relatively large dimensions. In general, air-core coils are characterized by low inductivity, which leads to a lower thrust force for a given construction and mode of activation.

U.S. Pat. No. 6,876,107 B2 discloses a transport system. Here, a carriage having a U-shaped yoke is provided, wherein permanent magnets are arranged on inner sides of the U-shaped yoke. Within the U-shaped yoke there are formed two opposing coils. With corresponding energization of the coils, a magnetic field forms which interacts with the magnetic field of the permanent magnets such that the carriage performs a translatory movement. Owing to the high number of coils required, such a construction exhibits high complexity, which leads to high costs for the components and the cabling thereof etc. Furthermore, such a construction requires a considerable amount of installation space.

US 2008/0036305 A1 presents a linear motor comprising multiple core/winding units which each comprise a core composed of steel and a coil wound around the core. Here, the core/winding units are fastened to holding elements, wherein the holding elements themselves are fastened to a frame.

DE 690 03 365 T2 presents a linear motor comprising a stator. The stator comprises multiple coils which are tightly surrounded and held by fastening elements. Here, the fastening elements are manufactured from non-magnetic conductive materials such as, for example, aluminum. Also provided is a circuit board which is arranged horizontally on the upper end of the coils. Electronic control circuits for the coils are arranged on the circuit board.

JP 002000324789 A presents an air-core coil comprising a reinforcement element composed of plastic around which a coil is wound. The coil is an air-core coil. Furthermore, the reinforcement element has a protuberance which can be inserted into a hole of a substrate with electrical terminals.

The known systems are thus disadvantageous in particular in that they require a considerably large installation space and exhibit mechanical instabilities, which can for example lead to disturbing vibrations during operation. Furthermore, the known systems also have the above disadvantages described in conjunction with air-core coils.

SUMMARY

The present invention provides an improved stator device for a linear motor and an improved linear transport system.

According to one aspect, a stator device for a linear motor comprises an electrically energizable magnetic field generator for forming a magnetic field and a first holding device for holding the magnetic field generator. The magnetic field generator is fastened to the first holding device. The first holding device is formed at least partially from any of an electrically and magnetically non-conductive material. The magnetic field generator comprises a coil and a stator tooth as a core around which the coil is wound. The first holding device is in the form of a printed circuit board for electrical contacting of the magnetic field generator.

According to a further aspect, a stator device for a linear motor comprises a first printed circuit board and a second printed circuit board which are arranged parallel to and opposite one another, multiple coils arranged between the two printed circuit boards in a coil region, a support profile element having a cavity into which the two printed circuit boards project and power electronics arranged in the cavity of the support profile element.

According to a further aspect, a linear transport system comprises a first stator device and a second stator device, the stator devices each having an electrically energizable magnetic field generator and a support profile element, a support profile element having at a first longitudinal end an opening and at a second longitudinal end a movable contacting printed circuit board. The movable contacting printed circuit board of the first and the second stator device is configured be inserted into the opening of the second and the first stator device, respectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows a stator device.
FIG. 2 shows a linear transport system.
FIG. 3 shows a further stator device.
FIG. 4 shows a stator tooth.
FIG. 5 shows a further stator tooth.

DETAILED DESCRIPTION

Figure 6:
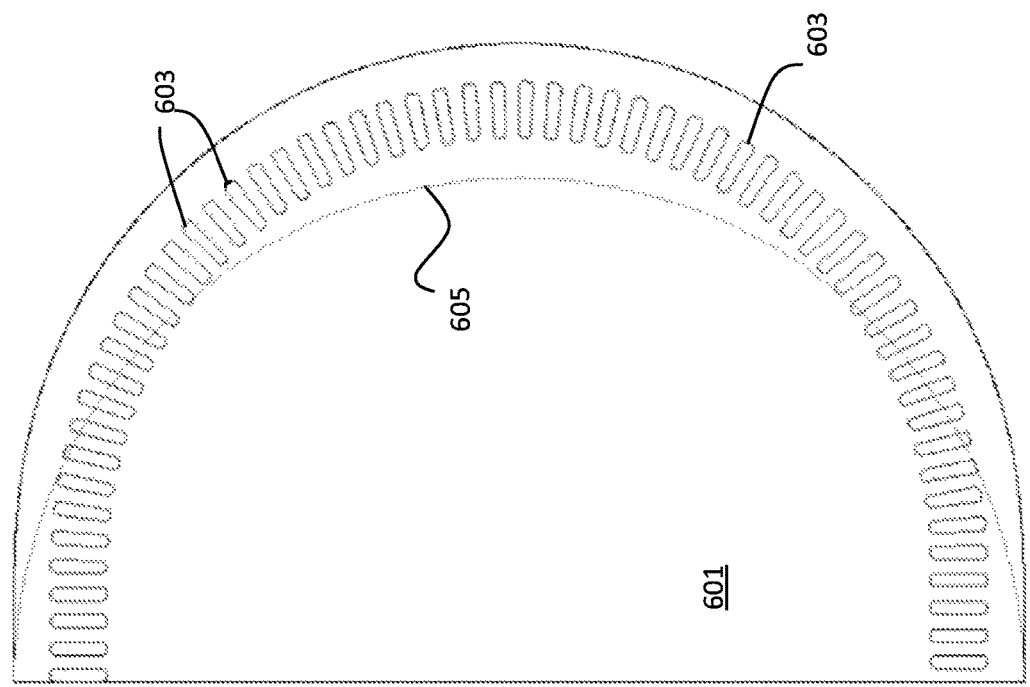
FIG. 6 shows a printed circuit board.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Below, the same reference numerals may be used for identical features.

FIG. 1 shows a stator device 101 for a linear motor. The stator device 101 comprises a magnetic field generator 103 for generating a magnetic field. The magnetic field generator 103 is electrically energizable. This means in particular that, when the magnetic field generator 103 is electrically energized, a corresponding magnetic field is formed.

The stator device 101 also comprises a first holding device 105 which is designed to hold the magnetic field generator 103. Here, the magnetic field generator 103 is fastened to the first holding device 105.

The first holding device 105 is formed as a printed circuit board for electrical contacting of the magnetic field generator 103. In particular, the magnetic field generator 103 can thus be electrically connected to the printed circuit board 105, so that the magnetic field generator 103 is electrically contacted hereby.

FIG. 2 shows a linear transport system 201. The linear transport system 201 comprises the stator device 101 as per FIG. 1. The linear transport system 201 also has a support 203 on which a further magnetic field generator 205 is arranged as a reaction part. The further magnetic field generator 205 may for example comprise one or more permanent magnets. The further magnetic field generator 205 may alternatively comprise, in particular, a soft magnetic material. The support 203 is designed in particular for being fastened to a vehicle, in particular to a carriage. By means of corresponding electromagnetic interaction between the magnetic field of the magnetic field generator 103 and of the further magnetic field generator 205, the support 203 and thus any vehicle fastened thereto can be displaced. In an embodiment, multiple further magnetic field generators 205 may be provided.

In a further embodiment, the further magnetic field generator 205 may be arranged in a beveled configuration and/or may preferably have a trapezoidal shape. This advantageously results in smaller force ripples in relation to a further magnetic field generator arranged in a straight configuration and having a rectangular shape, which furthermore advantageously leads to a more uniform movement or displacement of the support 203.

In another embodiment, it may be provided that, instead of the further magnetic field generator 205, the reaction part is formed as a structure composed of a soft magnetic material, or comprises a structure of said type.

FIG. 3 shows a further stator device 301. The stator device 301 comprises a first printed circuit board 303 as first holding device. The printed circuit board 303 has multiple first cutouts 305. The first cutouts 305 have a rectangular shape. The first cutouts 305 are arranged parallel and adjacent to one another, wherein the corresponding transverse sides of the first cutouts 305 lie in each case on a line. A rectilinear arrangement of the first cutouts 305 is thus advantageously realized.

Furthermore, multiple coils 307 are formed which are wound in each case around a stator tooth. The coils 307 with the stator teeth thus form a magnetic field generator. Here, one end of the stator tooth is inserted into the first cutout 305, such that the first cutouts 305 hold the coils 307. Here, the stator teeth preferably have a rectangular shape such that they fit into the first cutouts 305 in particular with a form fit.

Furthermore, the printed circuit board 303 comprises multiple solder pads 309 which are arranged along the first cutouts 305. The electrical contacting of the printed circuit board 303 with the coils 307 can be realized by means of the solder pad 309. This thus means in particular that the coils 307, in this case in particular corresponding coil ends, can be soldered to the printed circuit board 303.

Furthermore, the printed circuit board 303 comprises multiple holes 311 for through bores, in order for the printed circuit board 303 to thereby be fastened to profile elements, in particular by screw connection. The holes 311 are formed in a region above and below the respective transverse sides of the first cutout 305.

As shown in FIG. 3, between two coils 307, there is provided a first cutout 305 into which no stator tooth with a coil, that is to say no wound stator tooth, is inserted. It may preferably be provided that said first cutout 305 between two coils 307 remains free. In an alternative advantageous embodiment, a non-wound stator tooth may be inserted into said first cutout 305 between two coils 307. This advantageously yields a particular level of mechanical stabilization, in particular if, on the printed circuit board 303, a printed circuit board of analogous form is mounted congruently such that the stator teeth can likewise be inserted into corresponding cutouts of the second printed circuit board. The cutouts of the second printed circuit board may in particular be referred to as second cutouts.

Such a second printed circuit board thus advantageously forms a second holding device for holding the coils 307, wherein the coils 307 are arranged between the two printed circuit boards.

The second printed circuit board may preferably have no solder pads. This thus means in particular that the second printed circuit board has no solder pads for electrical contacting of the coils 307. Thus, the electrical contacting of the coils 307 then takes place only via the first printed circuit board 303.

After arrangement of the second printed circuit board on the first printed circuit board 303 by means of screw connection and/or fastening of the printed circuit boards into corresponding profile elements, an installation space, also referred to as structural space, is formed in a region 313 situated opposite a printed circuit board region below the first cutouts 305, in which installation space or structural space there can be installed, for example, activation electronics and/or power electronics and/or detection system electronics of a position detection system. Here, signals are preferably measured from which a position of a vehicle can be calculated in particular by means of a superordinate controller.

FIG. 4 shows a stator tooth 401. The upper drawing in FIG. 4 shows the stator tooth 401 in a plan view. A side view of the stator tooth 401 is shown below the plan view.

The stator tooth 401 has a rectangular shape. In an embodiment, it may be provided that the stator tooth 401 has a square shape. The stator tooth 401 as per FIG. 4 is in particular designed such that it can be inserted into the first and second cutouts of the two printed circuit boards of the stator device 301 in FIG. 3.

FIG. 5 shows a further stator tooth 501. The upper drawing in FIG. 5 shows a plan view of the stator tooth 501. The drawing below the plan view shows a side view of the stator tooth 501.

As shown in FIG. 5, the stator tooth 501 has a trapezoidal shape. The stator tooth 501 is designed in particular to be inserted into cutouts which have a corresponding shape such that the stator tooth 501 can be inserted into said cutout with a form fit. It is then advantageously also possible, for example, for a curve to be formed by means of such cutouts by virtue of the multiple cutouts being arranged along a curve.

The two geometric shapes of the stator teeth 401 and 501 as per FIGS. 4 and 5 are to be regarded merely as exemplary embodiments and not as restrictive. In particular, various other geometric shapes are also possible.

In the embodiment shown by way of example in FIGS. 4 and 5, the stator tooth may be manufactured from a sintered material. It is thus also possible for a stator tooth of said type to be manufactured from a sintered material using a simple sintering tool.

FIG. 6 shows a holding device which is in the form of a printed circuit board 601 and which has correspondingly formed cutouts into which the stator teeth 501 can preferably be inserted. The cutouts are denoted in FIG. 6 by the reference sign 603. Said cutouts are in this case arranged along a curve of clothoid form. A clothoid is in particular a curve in which a radius at the beginning is greater than a mean radius and a radius at a later point is smaller than a mean radius. This thus means in particular that a curvature profile of the clothoid increases linearly. Jerk-free travelling dynamics of a vehicle are thus advantageously realized. For comparison, a semicircular curve is shown and indicated by the reference sign 605.

The printed circuit board 601 may preferably have solder pads and/or holes for through bores, analogously to the printed circuit board 303. Analogously to the stator device 301 as per FIG. 3, a further printed circuit board may be provided which is of analogous form to the printed circuit board 601. Said two printed circuit boards may then preferably be arranged congruently one above the other and in particular screwed or fastened to arcuate profile elements. The stator teeth 501 are then inserted into and correspondingly fixed in the cutouts 603, wherein coils are wound around at least some of the stator teeth 501.

In an embodiment, stator teeth may be inserted into and fixed in first cutouts of a first printed circuit board, wherein fixing can be realized in particular by means of a form fit. The individual coils may subsequently be wound around the stator teeth. Alternatively, pre-wound coils may be pushed onto fixed stator teeth. It may alternatively be provided that individual stator teeth have a coil pre-wound thereon, and then the complete structural unit of stator tooth with coil is inserted into and fixed in the printed circuit board. In particular if a coil is only wound around every second stator tooth, it is possible to achieve a copper fill factor of the coils or of the coil winding of greater than 60%.

The geometries, shown in FIGS. 3 and 6, regarding the arrangement of the cutouts, that is to say on the one hand a linear arrangement and on the other hand an arrangement in clothoid form, are to be regarded merely as exemplary and not as restrictive. In embodiments, any desired geometries may be provided with regard to an arrangement of the cutouts. Such geometries may for example be an arc, a circle or a circular segment. For arcuate geometries, use is preferably made of trapezoidal stator teeth. It is also possible for preferably three-dimensional geometric arrangements to be provided by virtue of the holding devices having corresponding three-dimensional geometries.

Figure 7:
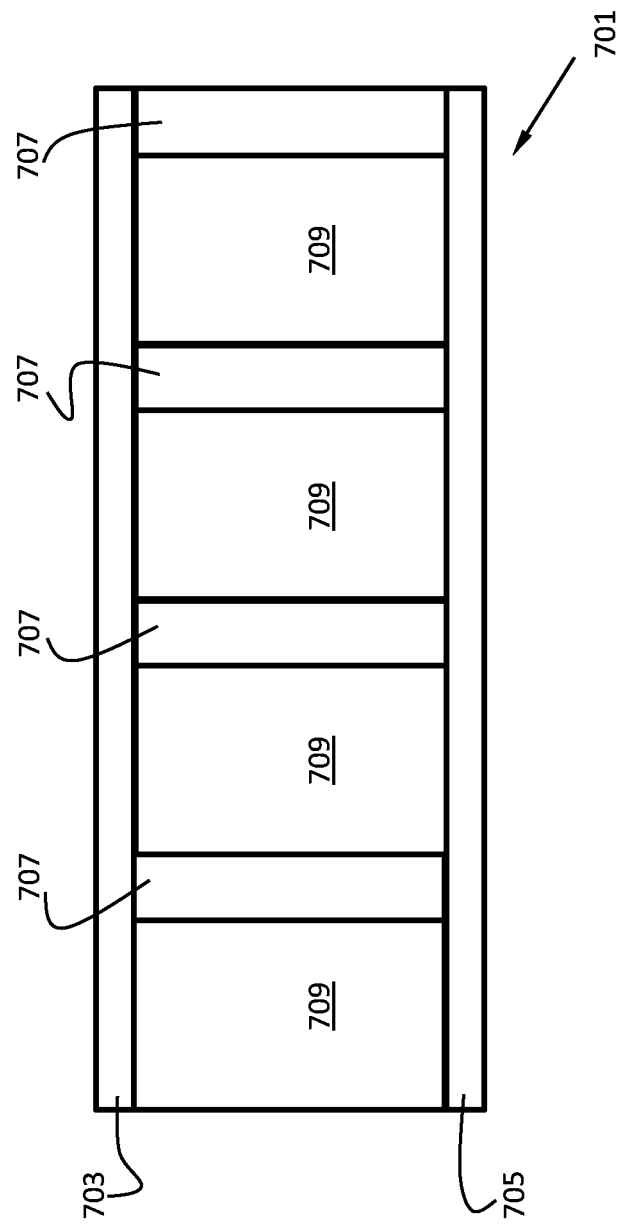
FIG. 7 shows another stator device.

FIG. 7 shows a further stator device 701 in a plan view. The stator device 701 comprises a first printed circuit board 703 and a second printed circuit board 705 as first and second holding devices. The two printed circuit boards 703 and 705 are arranged parallel to and opposite one another. The two printed circuit boards 703 and 705 correspondingly have first and second cutouts which are arranged opposite one another. Into said cutouts there are inserted stator teeth 707, wherein a coil 709 is wound around every second stator tooth 707. Since the coil 709 covers the corresponding stator tooth 707, said stator tooth is not explicitly shown in the stator coils 709. This thus means in particular that a coil 709 and a non-wound stator tooth 707 are provided alternately. This thus means in particular that in each case one wound stator tooth and one unwound or non-wound stator tooth are provided alternately.

Figure 8:
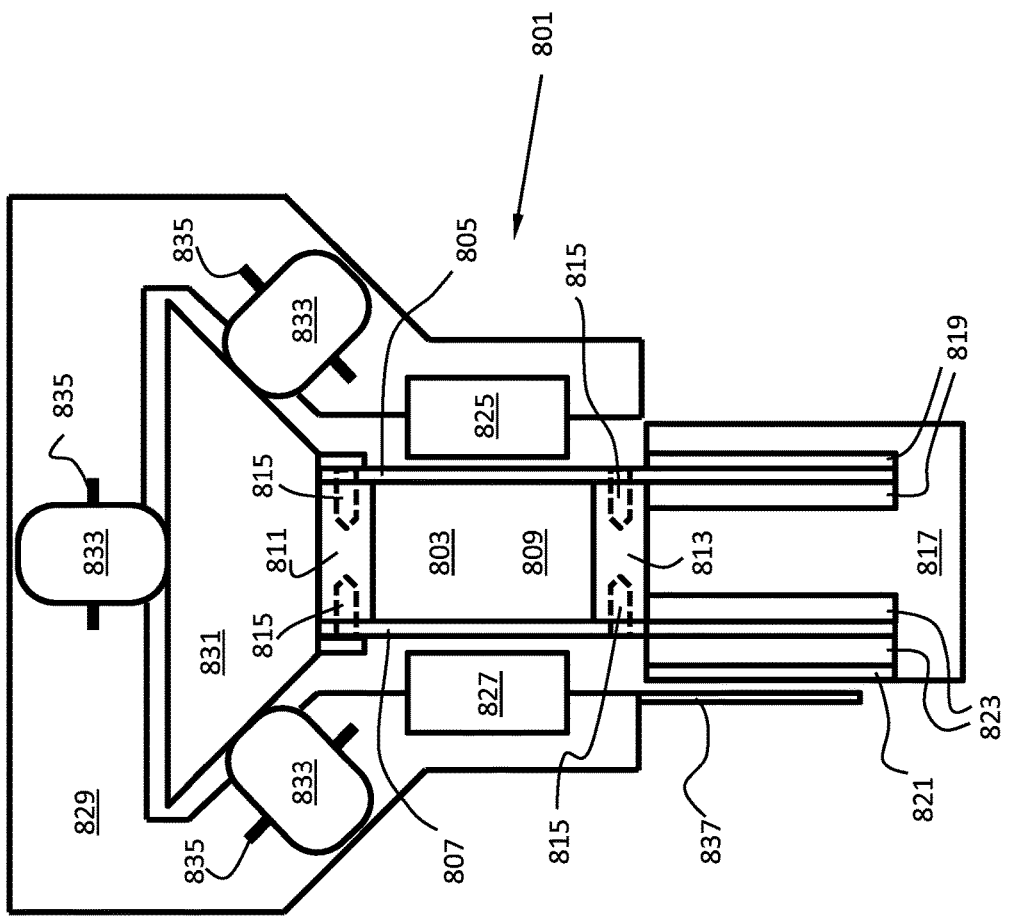
FIG. 8 shows a further linear transport system.

FIG. 8 shows a linear transport system 801 in a front-on cross-sectional view. The linear transport system 801 comprises a stator device 803. The stator device 803 comprises a first printed circuit board 805 and a second printed circuit board 807 which are arranged parallel to and opposite one another. The stator device 803 with the two printed circuit boards 805 and 807 may in particular be of analogous form to the stator device 701 with the two printed circuit boards 703 and 705 as per FIG. 7. Corresponding statements made in conjunction with FIG. 7 preferably apply analogously to the stator device 803.

A region between the two printed circuit boards 805 and 807 of the stator device 803 is denoted by the reference sign 809 and may be referred to as a coil region by virtue of the fact that multiple coils are arranged in said region. Here, said coils are wound around stator teeth which are inserted into corresponding cutouts of the two printed circuit boards 805 and 807. Here, reference may again be made to FIG. 7, which shows an overview of a coil arrangement of said type.

A profile element 811 is formed above the coil region 809. A profile element 813 is likewise formed below the coil region 809, the latter profile element running parallel to the former profile element 811. The two profile elements 811 and 813 have a longitudinal extent analogous to the two printed circuit boards 805 and 807, such that the two printed circuit boards 805 and 807 can be screwed to the two profile elements 811 and 813 by means of screws 815. For this purpose, the two printed circuit boards 805 and 807 have corresponding holes. The two profile elements 811 and 813 advantageously support the two printed circuit boards 805 and 807, and in particular advantageously generate mechanical stabilization of the stator device 803. The two profile elements 811 and 813 may thus preferably be referred to as supporting profile elements. The two profile elements 811 and 813 are in particular arranged with a spacing small enough that thermal coupling is realized between the coils and the profile elements 811 and 813, such that it is advantageously possible for thermal energy that is generated during the operation of the coils, in particular during the energization thereof, to be dissipated such that overheating of the coils can be prevented in an effective manner. The two profile elements 811 and 813 may thus also preferably be referred to as a thermal energy dissipater for dissipating thermal energy.

Below the profile element 813 there is formed a support profile element 817, on which the profile element 813 is arranged and/or fastened. This thus means in particular that the support profile element 817 supports the stator device 803. In an embodiment, the profile element 813 and the support profile element 817 may be formed as a common profile element. The support profile element 817 may in particular have a cavity into which the two printed circuit boards 805 and 807 project, wherein power electronics 819 and/or position detection system electronics 823 of a position detection system may be arranged in said cavity or installation space. A cavity of said type is in this case formed analogously, in particular adjacent, to the region 313 of the printed circuit board 303 of the stator device 301 in FIG. 3. The element with the reference sign 821 denotes a printed circuit board of the position detection system electronics 823.

The linear transport system 801 also comprises two permanent magnets, which may also be referred to as permanent magnets 825 and 827. The two permanent magnets 825 and 827 are arranged in each case adjacent to the coil region 809. This thus means in particular that the permanent magnet 825 is situated to the right of the printed circuit board 805. The permanent magnet 827 is situated on the left, adjacent to the printed circuit board 807. Here, the two permanent magnets 825 and 827 are arranged spaced apart from the corresponding printed circuit boards 805 and 807. A gap is thus formed in each case between the permanent magnets 825 and 827 and the printed circuit boards 805 and 807. Such an arrangement as per FIG. 8 may therefore also be referred to as a double gap arrangement.

In an embodiment, it is also possible for multiple permanent magnets 825 and 827 to be provided which are arranged in each case to the left and to the right of the corresponding printed circuit boards 805 and 807.

The permanent magnets 825 and 827 are held in each case by a support, wherein a vehicle 829 is fastened to the two supports.

Furthermore, a guide 831 for the vehicle 829 is arranged on the profile element 811 which is situated above the coil region 809. The profile element 811 can in this respect, in particular also in conjunction with the printed circuit boards 805 and 807, be referred to as a mounting device for the fastening of a guide for guiding a vehicle.

The guide 831 has a trapezoidal shape, wherein, against three sides of the trapezium, there bears in each case one running roller 833 with corresponding running axle 835. The running rollers 833 are arranged on the vehicle 829 such that said running rollers enable the vehicle 829 to perform a rolling movement along the guide 831. The running rollers 833 may also, without limitation and with any desired variation, be provided in other embodiments with regard to position, arrangement, geometry and number.

In an embodiment, it may additionally or alternatively be provided that the vehicle is guided along the guide 831 in magnet-mounted and/or fluid-mounted, in particular gas-mounted, preferably air-mounted fashion.

A position detection element 837 in the form of an elongate areal element is formed on the support which holds the permanent magnets 827. Said element runs downward away from the vehicle 829, so as to form an extension, in the direction of the support profile element 817 and is arranged opposite the position detection system electronics 823. The position detection system electronics 823 is designed in particular to detect the presence of the position detection element 837, such that a position of the vehicle 829 can advantageously be determined in this way. From the measured signals, it is preferably possible at some other location, for example by means of a superordinate controller, for a position to be calculated.

Figure 9:
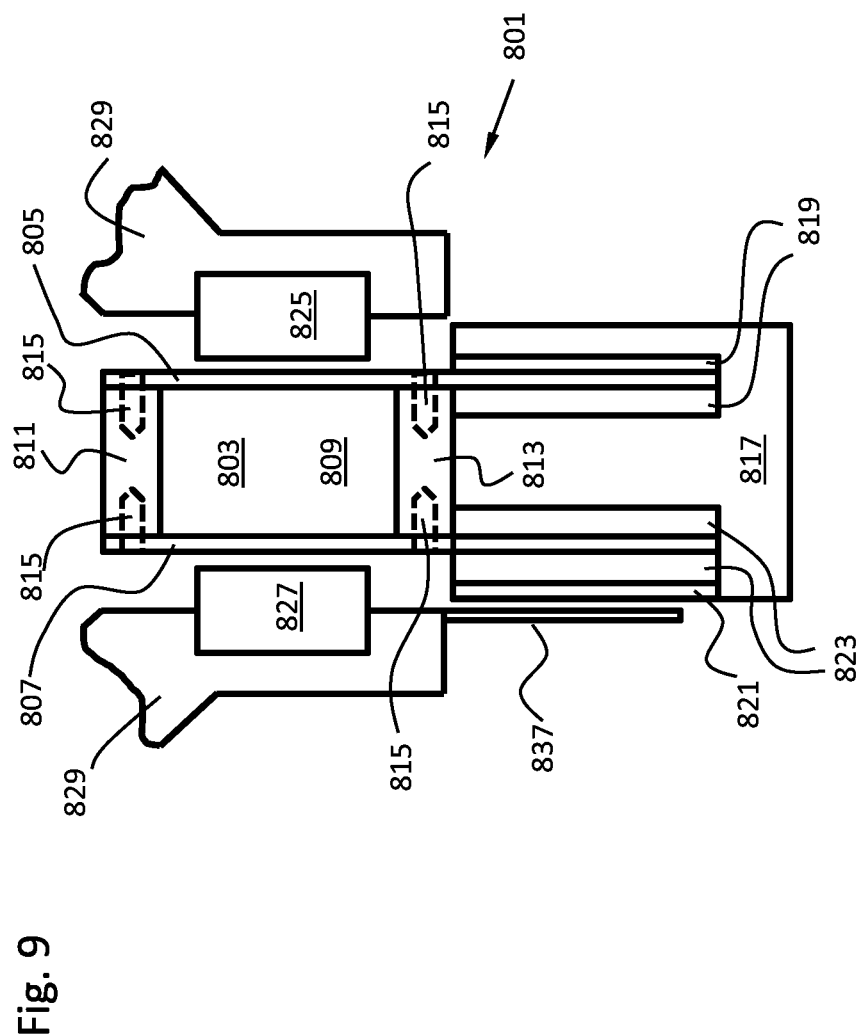
FIG. 9 shows the linear transport system as per FIG. 8 in a simplified illustration.

FIG. 9 shows the linear transport system 801 as per FIG. 8 in a slightly simplified illustration insofar as the vehicle 829, with the guide 831 and the running rollers 833, is not illustrated in its entirety here. It is pointed out here in particular that the linear transport system 801 is also disclosed without the vehicle 829, a guide 831 and an optional separate mounting device for fastening of the guide, that is to say an element which is separate from the profile element 811.

Figure 10:
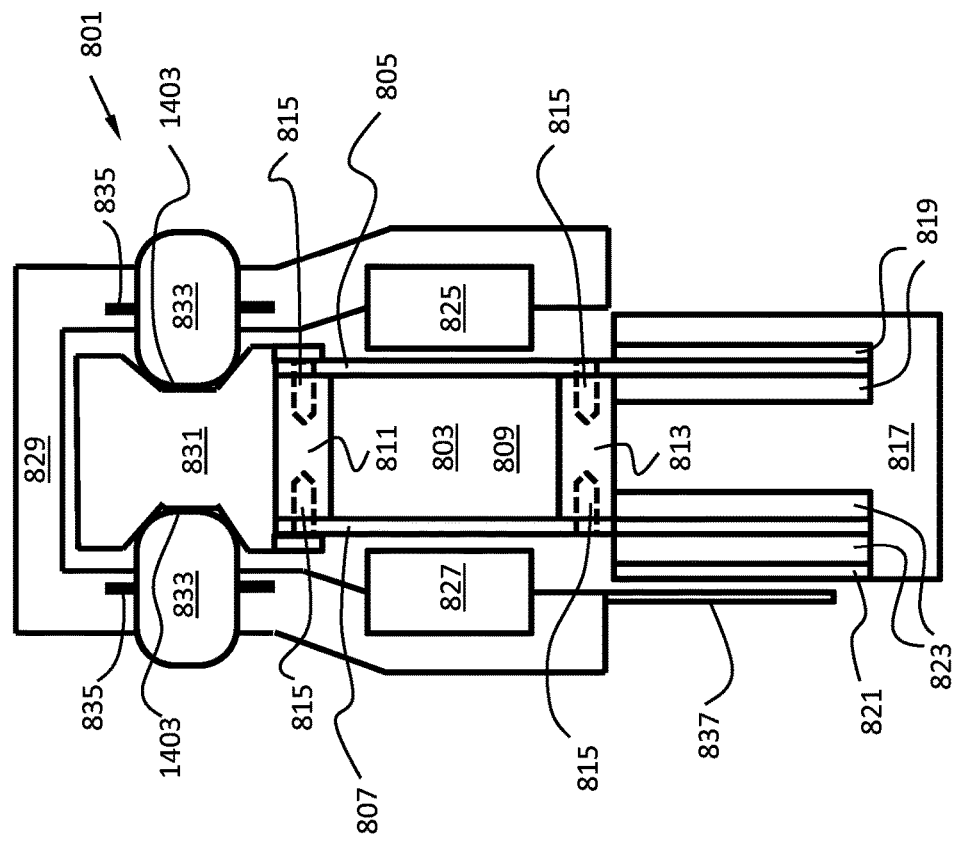
FIG. 10 shows a further linear transport system.

FIG. 10 shows a further linear transport system 801 which is of substantially analogous form to the linear transport system 801 as per FIG. 8.

As a difference with respect to the linear transport system 801 as per FIG. 8, the guide 831 has, in cross section, two opposite constrictions 1403. This thus means in particular that the guide 831 has an hourglass shape in cross section. It is then advantageously possible for the running rollers 833 to rest in said constrictions 1403 and run along in said constrictions 1403.

The embodiments of the running rollers 833 shown in FIG. 10 are to be understood merely as exemplary, and not as restrictive, with regard to position, arrangement, geometry and number.

Figure 11:
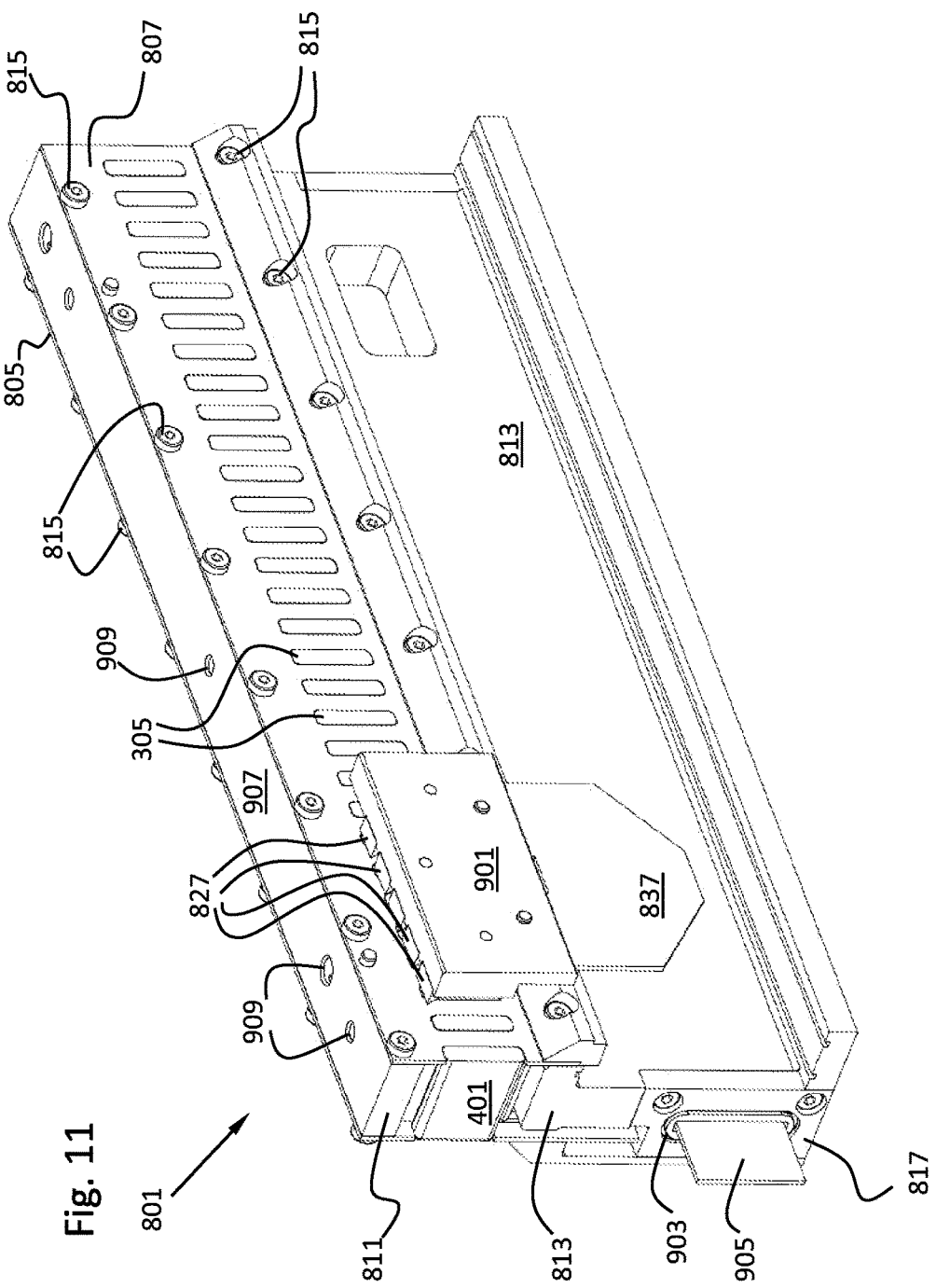
FIG. 11 shows a view of the linear transport system as per FIG. 8.

FIG. 11 shows an oblique plan view of the linear transport system 801 as per FIGS. 8, 9 and 10, wherein here, corresponding to the statements made above, the vehicle 829 and the guide 831 have been omitted for clarity.

FIG. 11 shows the support 901, which holds multiple permanent magnets 827. Also shown in more detail is the position detection element 837, which may in particular be in the form of an electrical board with damping action.

The support profile element 817 has at one longitudinal end an opening 903 into which a contacting printed circuit board 905 can be inserted. Electrical contacting of the printed circuit boards 805 and/or 807 is made possible by means of said contacting printed circuit board 905.

Figure 12:
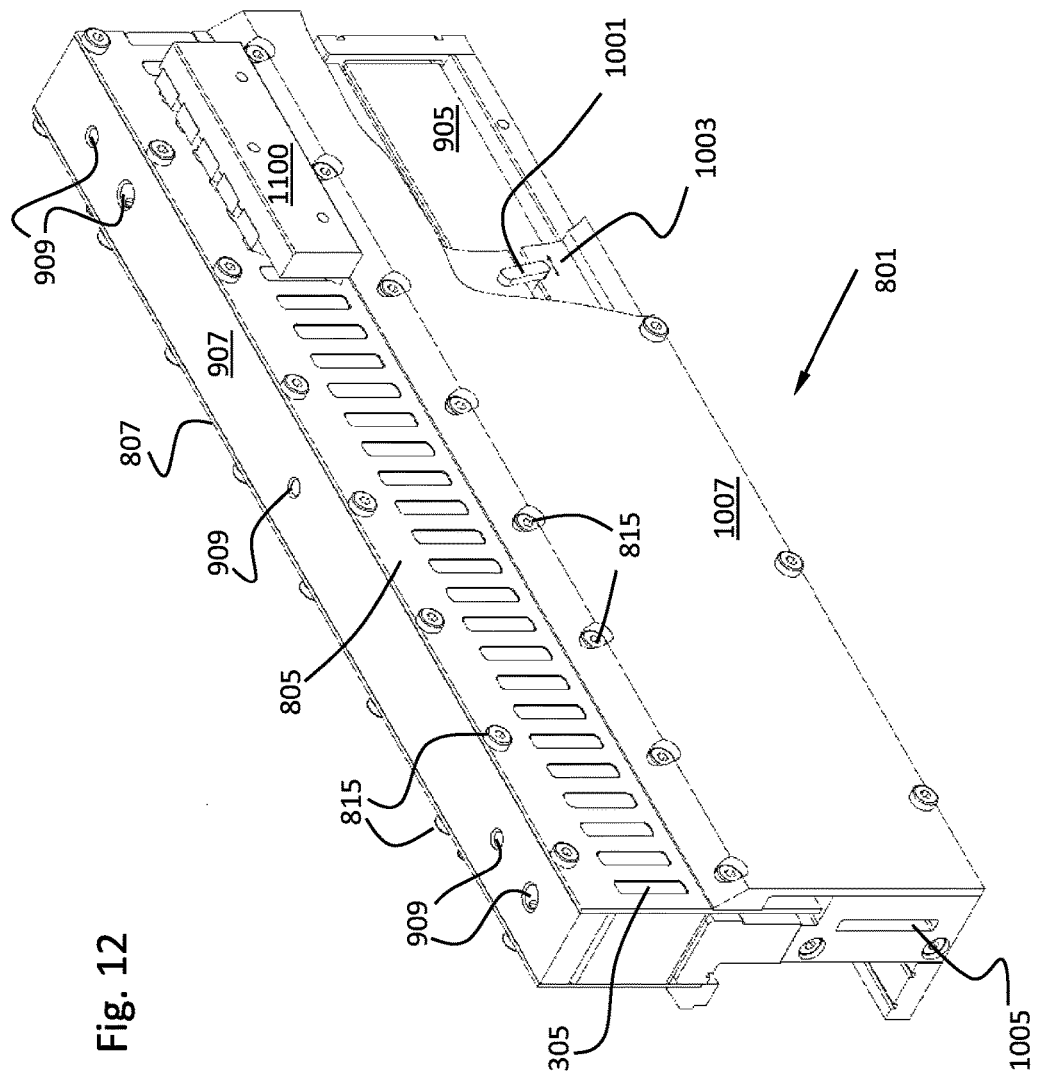
FIG. 12 shows a further view of the linear transport system as per FIG. 8.

FIG. 12 shows an oblique plan view, corresponding to a rear view in relation to the view as per FIG. 11, of the linear transport system 801. At a longitudinal end situated opposite the longitudinal end with the opening 903, there is provided a further opening 1005 into which there can be inserted a further contacting printed circuit board of a preceding further linear transport system. An electrical connection to a further linear transport system, which may be of analogous form to the linear transport system 801, is thus advantageously made possible. It is thus advantageously possible to form a modular system, wherein the individual modules may be formed by the linear transport systems 801.

FIG. 12 furthermore shows a displacement means 1001 which interacts with the contacting printed circuit board 905 so as to generate a longitudinal displacement of the contacting printed circuit board 905. Said displacement is symbolically indicated here by means of a double arrow with the reference sign 1003. To make the displacement means 1001 visible, a cover plate 1007 is, for clarity, shown in symbolically cut-away form in the corresponding region.

A contacting printed circuit board of said type has, in particular, the following action or function. Two linear transport systems can thereby be fastened, adjacent to one another in a longitudinal direction, to a holding profile, wherein by means of the displacement of the electrical board or contacting printed circuit board 905 from one system into the next system, contact is automatically established with the adjacent system. This thus means in particular that contact can be established between two linear transport systems by means of an electrical board 905. Behind the opening 1005 there is situated, for example, a plug connector composed of multiple spring contacts, such that the displaced-in electrical board 905 is held in position and contacted. This offers the advantage in particular that the individual modules or transport systems can, in the event of servicing, be removed in a sideways direction without the modules having to be slid apart from one another. Furthermore, the overall system comprising the two or more linear transport systems then also requires only one connection line to the voltage supply and for connection to a superordinate controller.

FIGS. 11 and 12 also show a surface 907 of the profile element 811, wherein the surface 907 has multiple cutouts 909 into which screws and/or rivets and/or dowel pins can be inserted or screwed in order to fasten the guide 831 to the profile element 811.

Figure 13:
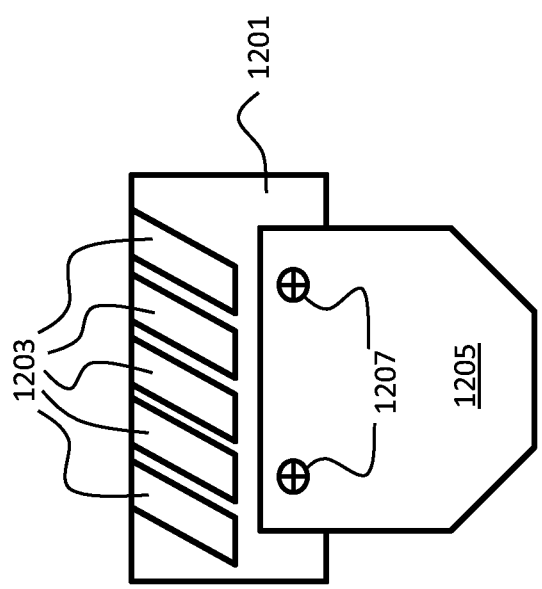
FIG. 13 shows a support.

FIG. 13 shows a support 1201 comprising multiple trapezoidal permanent magnets 1203. The support 1201 may preferably also be referred to as a magnet support. Below the permanent magnets 1203 there is arranged a position detection element 1205 which is screwed to the support 1201 by means of screws 1207.

A support 1201 of said type may be used in particular in the linear transport system 801. The support 901 as per FIG. 11 is preferably of analogous form to the support 1201.

A vehicle may then preferably be fastened to the support 1201.

The trapezoidal shape of the permanent magnets 1203 advantageously results in smaller force ripples by comparison with permanent magnets of rectangular shape, which furthermore advantageously leads to a more uniform movement or displacement of the support 1201.

In FIG. 12, the reference sign 1100 denotes an alternative embodiment of the support which is of analogous form to the support 1201 as per FIG. 13 but does not have the position detection element 1205.

Figure 14:
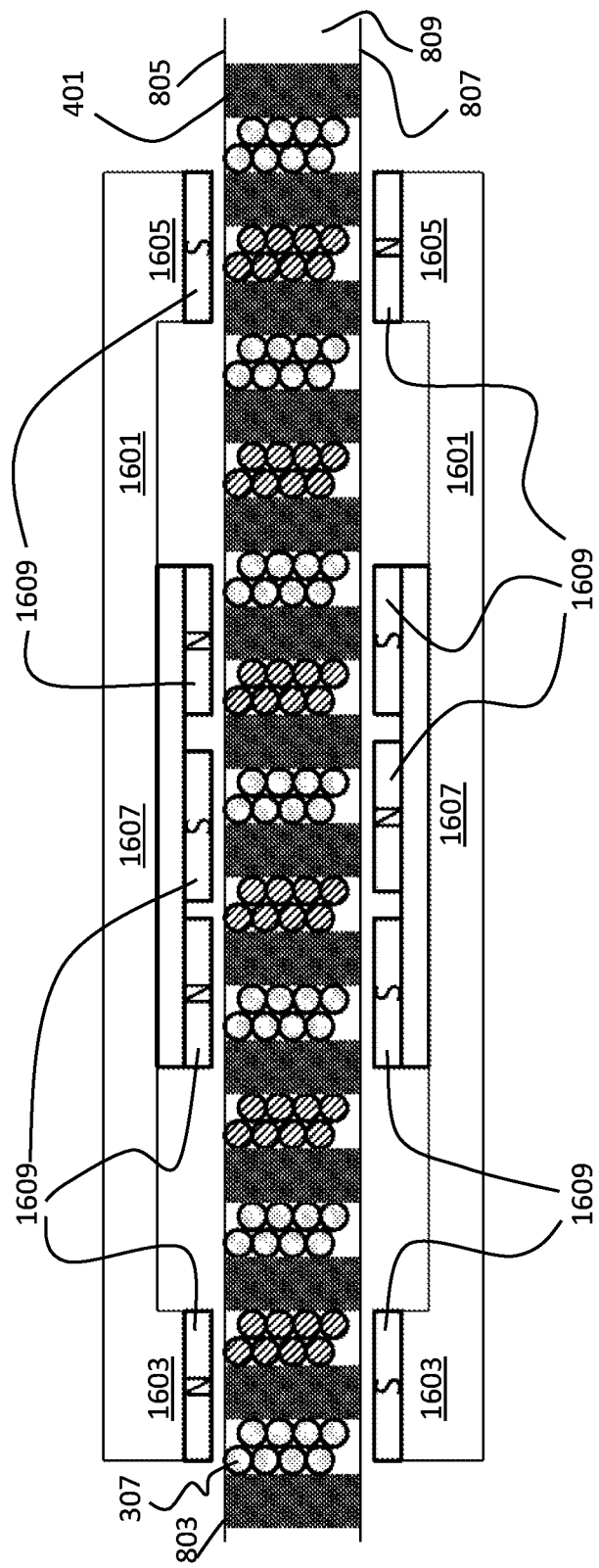
FIG. 14 shows two reaction parts.

FIG. 14 shows two supports 1601 for a reaction part, each comprising multiple permanent magnets 1609. Corresponding north and south poles of the permanent magnets 1609 are denoted by the letters "N" and "S".

The two supports 1601 have in each case two opposite end regions 1603 and 1605. In each case one central region 1607 is formed between the two end regions 1603 and 1605.

Here, the permanent magnets 1609 are arranged in the central region 1607 and in the end regions 1603 and 1605. It is provided in particular that in each case one intermediate region in which no permanent magnet is arranged is formed between the end regions 1603 and 1605 and the central region 1607. Said intermediate region thus has no magnets. A distance between the end regions 1603 and 1605 and the central region 1607 is preferably greater than or equal to a diameter of a coil 307, that is to say in particular greater than or equal to a coil width. Interactions of the individual permanent magnets 1609 with the associated coils 307 of the different regions 1603, 1605 and 1607 are thus advantageously prevented or at least reduced.

The two supports 1601 are arranged adjacent to and spaced apart from the stator device 803 on opposite sides thereof. The individual coils 307 are correspondingly energized such that a thrust force is generated by means of the interaction between the permanent magnets 1609 of the central region 1607 and the coils 307 correspondingly arranged in between.

The permanent magnets 1609 arranged in the end regions 1603 and 1605 likewise interact with the interposed coils 307, which are correspondingly energized such that, here, a repelling force is generated between the supports 1601 and the stator device 803. Magnetic suspension is thus realized here. This advantageously has the effect that a guide is mechanically relieved of load. This thus means in particular that the magnetic suspension generated here has the effect in particular that corresponding running rollers in the corresponding guide are mechanically relieved of load, such that in particular, wear of the running rollers is advantageously reduced or prevented.

In an embodiment, it is possible for only one support 1601 to be provided.

Figure 15:
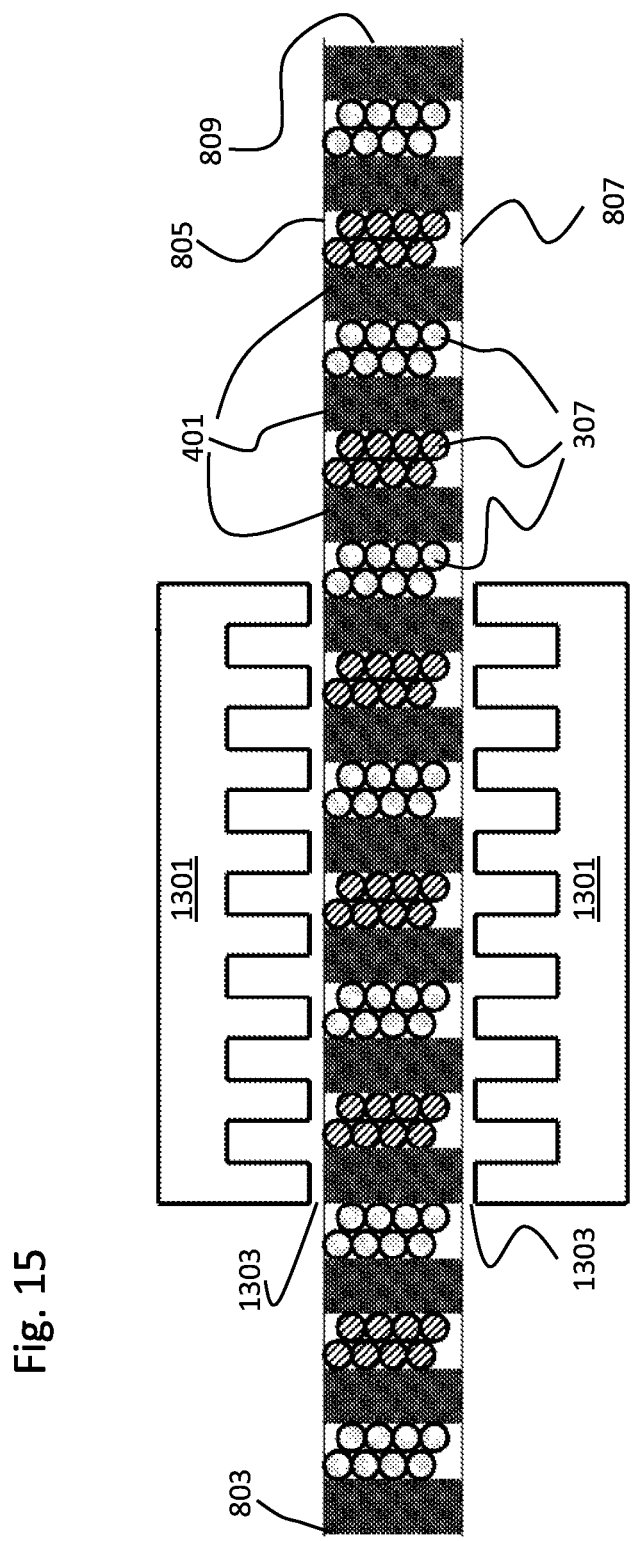
FIG. 15 shows two reaction parts in an alternative embodiment.

FIG. 15 shows two reaction parts 1301 which are held in each case by a support. A support of said type may for example be fastened to a vehicle or carriage.

The two reaction parts 1301 are in the form of a comb-like structure composed of a soft magnetic material. Here, the two comb-like structures 1301 are arranged opposite one another, wherein the stator device 803 is situated between the two reaction parts 1301. This advantageously has the effect that a linear motor is formed which operates on the basis of the reluctance principle. The linear motor may thus in particular be referred to as a reluctance motor.

In each case one gap 1303 is formed between the reaction parts 1301 and the stator device 803. This thus means in particular that the two reaction parts 1301 are arranged spaced apart from the stator device 803. The thrust force that can be achieved by means of a reluctance motor of said type is dependent in particular on the size of the gap 1303, that is to say on the distance between the reaction parts 1301 and the stator device 803. In general, the smaller the gap 1303, the greater the thrust force that can be achieved.

In an exemplary embodiment, it is possible for only one reaction part 1301 to be provided, such that there is correspondingly only one gap 1303 between the reaction part 1301 and the stator device 803.

The provision of a soft magnetic material on the support has the effect that higher speeds of the support and of the vehicle are made possible in relation to the provision of permanent magnets. This results in particular from the fact that a countervoltage that is induced in the coils 307 of the stator device 803 by the permanent magnets is no longer generated.

In an embodiment, one or two supports may be provided which are formed from a soft magnetic material.

The stator device for a linear motor and the corresponding linear transport system have a simpler construction, wherein in particular, electrical contacting of a magnetic field generator for forming a magnetic field can be performed in a simple manner.

The stator device comprises an electrically energizable magnetic field generator for forming a magnetic field. Furthermore, a holding device for holding the magnetic field generator is formed. The magnetic field generator is fastened to the holding device. The holding device is at least partially formed from an electrically and/or magnetically non-conductive material.

The linear transport system comprises the above-mentioned stator device and a support for a vehicle, wherein the support comprises a reaction part which is designed to interact with the magnetic field formed by means of the magnetic field generator of the stator device, such that in particular, a thrust force is advantageously formed that displaces or moves the support. The reaction part is preferably formed as a further magnetic field generator for forming a magnetic field. In particular, multiple supports may be formed, which supports are preferably of identical or different form.

The provision of a material composed of an electrically and/or magnetically non-conductive material for the holding device advantageously has the effect that the holding device has no influence, or at least no disruptive influence, on a magnetic circuit. The holding device thus yields in particular a high level of mechanical strength with regard to retention of the magnetic field generator. Furthermore, the electrically and/or magnetically non-conductive material advantageously yields a reduction in eddy-current losses.

In one embodiment, the holding device may be in the form of a printed circuit board for electrical contacting of the magnetic field generator. It is thus advantageously possible to realize simple electrical contacting, for example by virtue of the magnetic field generator being soldered to the printed circuit board, with simultaneously high mechanical strength.

It is thus preferable for a printed circuit board to be provided which can advantageously both realize electrical contacting for the magnetic field generator and also hold the magnetic field generator. The printed circuit board thus advantageously performs a dual function in that it both holds and also realizes electrical contacting for the magnetic field generator.

In particular, it is thus possible to save material if, instead of two separate components which each perform only one of the above-mentioned functions, that is to say holding and electrical contacting, use is now made of one component, the printed circuit board, having both functionalities. Assembly of the stator device is also simplified considerably. The magnetic field generator is fastened to the printed circuit board, wherein then an electrical connection can be formed between the magnetic field generator and the printed circuit board by means of electrical contacting of the magnetic field generator. By virtue of the fact that the magnetic field generator is fastened to the printed circuit board, a corresponding electrical connection can be designed to be relatively short in relation to the prior art. Here, too, it is thus advantageously possible for material and assembly time to be saved. Furthermore, such an embodiment also has a smaller structural volume than known systems.

Within the context of the present invention, a printed circuit board is in particular a support for electronic components. Within the context of the present invention, a printed circuit board is designed in particular for the fastening and electrical connection or contacting of electronic components. Within the context of the present invention, a printed circuit board may in particular be in the form of a conductor board, an electrical board or a printed circuit. Within the context of the present invention, a printed circuit board comprises in particular an electrically insulating material with electrically conductive connections which can preferably be arranged on, preferably adhere to, the electrically insulating material. Said electrically conductive connections can preferably also be referred to as conductor tracks. The printed circuit board preferably comprises a plastic, in particular a fiber-reinforced plastic, as electrically insulating material. Through the provision of a fiber-reinforced plastic, particularly high mechanical stability of the printed circuit board is advantageously realized in at least one preferential direction, in particular in multiple preferential directions. Here, further mechanical stability may be realized in particular by means of an encapsulation of the magnetic field generator. The printed circuit board is thus capable in particular of holding even relatively large and heavy magnetic field generators. It may preferably be provided that the conductor tracks, that is to say the electrically conductive connections, are embedded in the electrically insulating material. The electrical conductor tracks are thus advantageously protected against external influences. In particular, this also advantageously has the effect that a risk of electrical short circuit is reduced if not eliminated entirely if the electrical conductor tracks are insulated both from one another and also from further electrically conductive components by means of the electrically insulating material. The provision of a printed circuit board comprising a plastic, in particular a fiber-reinforced plastic, also has the advantage in particular that a printed circuit board of said type does not influence a magnetic circuit, that is to say a magnetic field.

As an electrically and/or magnetically non-conductive material, it is generally preferable for a resin or a ceramic to be provided. In particular, it may generally be provided that the holding device comprises, or is at least partially formed from, multiple different electrically and/or magnetically non-conductive materials. The material may for example be a plastic, in particular a fiber-reinforced plastic.

In one embodiment, it may preferably be provided that the reaction part is formed as a structure from a soft magnetic material or comprises a structure of said type. A soft magnetic material refers in particular to a ferromagnetic material which can be easily magnetized in a magnetic field. A soft magnetic material has no inherent permanent magnetic field, or only a very weak inherent magnetic field, that is to say is not a permanent magnet. The soft magnetic material preferably has a coercive field strength of less than 1000 A/m. A soft magnetic material may for example comprise iron and/or ferrites, which are in particular ceramic or sintered materials. A soft magnetic material may for example comprise a cobalt-iron alloy and/or a nickel-iron alloy and/or ferrosilicon (FeSi) alloy and/or iron-aluminum-silicon (FeAlSi) alloy. A material may be classified as a soft magnetic material in particular in accordance with the IEC 60404-1 standard. This thus means in particular that a soft magnetic material may be selected from the group of materials formed by said standard.

The provision of such a soft magnetic material has the effect that a linear motor of said type comprising the stator device and the support with the soft magnetic material operates on the basis of the reluctance principle. Such a linear motor can thus be referred to in particular as a reluctance motor. The mode of operation is in particular as follows.

The movement or displacement of the support arises in particular as a result of the fact that the system comprising the soft magnetic material and the magnetic field generator strives to achieve minimum reluctance, also referred to as magnetic resistance. Here, the soft magnetic material is magnetized owing to the magnetic field formed by the magnetic field generator, and is magnetically attracted by the magnetic field generator such that the support is displaced. In particular if multiple magnetic field generators are provided along a travel path, the magnetic field generators are energized temporally in succession, such that, along the travel path, a magnetic field builds up which correspondingly magnetically attracts the soft magnetic material, wherein it may preferably be provided that, when maximum convergence on the movable part is achieved, that is to say when the gap between magnetic field generator and soft magnetic material has been minimized, a corresponding energy supply is deactivated. This thus means in particular that, when the gap has been minimized or the magnetic field lines assume the shortest possible path and no longer generate a thrust force, the current for the corresponding magnetic field generator is deactivated.

This thus means in particular that the first magnetic field generator is energized in order to magnetically attract the vehicle in the direction of the first magnetic field generator. When the gap has been minimized or the magnetic field lines have assumed the shortest possible path and no longer generate a thrust force, a current for the first magnetic field generator is deactivated. Then, a second magnetic field generator which is arranged so as to follow the first magnetic field generator is energized such that the second magnetic field generator magnetically attracts the support, and thus in particular a vehicle, in the direction of the second magnetic field generator. When the gap has been minimized or the magnetic field lines have assumed the shortest possible path and no longer generate a thrust force, a current for the second magnetic field generator is deactivated. Then, a third magnetic field generator which is arranged so as to follow the second magnetic field generator is energized such that the third magnetic field generator magnetically attracts the support and thus the vehicle in the direction of the third magnetic field generator. The above-stated steps are then performed analogously for the fourth and any further following magnetic field generators.

In a further embodiment, the energization may be performed in accordance with a mathematical function. A sinusoidal function, for example, may be provided. It is preferably possible for the energization to take place with temporally different and/or locally different displacements in multiple magnetic field generators simultaneously, such that here, it is not merely simple activation and deactivation that is performed.

In one embodiment, the holding device has a hole or multiple holes for fastening bores, such that the magnetic field generator can advantageously be screwed to the holding device. Such a fastening has the advantage in particular that it can be configured to be detachable, such that, for example, an exchange of the magnetic field generator can be performed in a particularly simple manner.

In another embodiment, the magnetic field generator may be adhesively bonded to the holding device. It is thus advantageously possible to realize a particularly reliable and permanently retentive fastening of the magnetic field generator to the holding device.

Within the context of the present invention, a magnetic field generator is designed in particular so as to form a magnetic field when electrically energized. This applies analogously to the further magnetic field generators. For the purpose of better distinction, the magnetic field formed by the further magnetic field generator is referred to as further magnetic field. The magnetic field and the further magnetic field advantageously interact with one another such that, by means of the vector product of the Lorentz force, a thrust force is imparted to the support, such that the latter performs a movement, in particular a translatory movement.

In one embodiment, a vehicle may be fastened to the support, such that said vehicle can be displaced correspondingly. Within the context of the present invention, a vehicle may preferably also be referred to as a carriage. In English, the expression "mover" is generally used for this. It is preferably possible for the further magnetic field generator to form a static magnetic field. This thus means in particular that the further magnetic field is a static magnetic field. The further magnetic field generator preferably comprises one or more permanent magnets. In particular, the further magnetic field generator may be in the form of a permanent magnet.

In a further embodiment, the support may have multiple further magnetic field generators. It is preferable for the support to have multiple magnetic field generators which are arranged opposingly at respectively opposite ends of the magnetic field generator, such that a gap is formed between the further magnetic field generators and the magnetic field generator. The magnetic field generator and the further magnetic field generators in the linear transport system are thus arranged spaced apart from one another. It is preferable for the support to have two legs, wherein the multiple magnetic field generators are formed on inner sides of the legs. The magnetic field generator may preferably be arranged between the two legs and opposite the inner sides of the legs. The support preferably has a U shape. Owing to the two legs and the corresponding arrangement, a double gap arrangement is formed in that in each case one gap is formed between the inner sides of the legs and the corresponding sides of the magnetic field generator.

In one embodiment, the magnetic field generator may be electrically connected to or contacted with electrical conductor tracks situated on and/or in the holding device, in particular the printed circuit board, by means of a solder pad or multiple solder pads. This thus means in particular that electrical contacting of the magnetic field generator is realized by means of the solder pad or by means of the solder pads.

In a further embodiment, the magnetic field generator may be electrically connected to or contacted with electrical conductor tracks situated on and/or in the holding device, preferably the printed circuit board, by means of a plug connector and/or a screw connection and/or a clamped connection and/or or a soldered connection. This thus means in particular that electrical contacting between the magnetic field generator and the holding device, for example the printed circuit board, can be realized by means of a plug connector and/or a screw connection and/or a clamped connection and/or a soldered connection. It is preferably also possible for multiple plug connectors, screw connections, clamped connections and/or soldered connections to be provided.

In another embodiment, multiple magnetic field generators may be provided. It is thus possible, for example, for a particularly large magnetic field to be formed. Furthermore, it is thus advantageously also possible to form a spatially extended region in which a magnetic field can be formed. A travel path can thus advantageously be formed. The multiple magnetic field generators may preferably be of identical or different form. It is preferably possible for the multiple magnetic field generators to be individually energized such that, in particular, it is advantageously possible for different magnetic fields to be formed in each case. The multiple magnetic field generators are preferably connected so as to form a multi-phase system. It is possible in particular for three phases to be provided. This thus means in particular that each magnetic field generator of the multiple magnetic field generators is assigned one phase of an electrical current.

In one embodiment, the magnetic field generator may comprise a coil. The magnetic field generator may preferably comprise multiple coils. The coils may preferably be of identical or different form. In a further possible exemplary embodiment, the coil is in the form of an air-core coil. An air-core coil has no core, that is to say is of coreless form. The core is, as it were, composed of air. In an alternative advantageous embodiment, the coil may comprise a core. This thus means in particular that the coil is wound around a core. The core may for example be an iron core. The core may for example be formed from a hollow material or a solid material. The core may preferably comprise a soft magnetic material. In particular, the core has a material with high permeability and/or with low remanence. The core preferably comprises a sintered material. The core may in particular be formed from a sintered solid material. The provision of a sintered material in a core of a coil has the advantage in particular that the eddy currents that can be induced in a core of said type are low to non-existent, whereby eddy-current losses can be advantageously reduced if not eliminated entirely.

In another embodiment, a second holding device for holding the magnetic field generator is formed. It is preferable for the magnetic field generator to be fastened to the second holding device. In particular, the magnetic field generator is arranged between the two holding devices. The two holding devices are preferably arranged opposite one another. The provision of a second holding device has the advantage in particular that it enables the magnetic field generator to be held with even greater reliability. The statements made in conjunction with the first holding device apply analogously to the second holding device. This thus means in particular that the second holding device may also comprise, or be at least partially formed from, an electrically and/or magnetically non-conductive material.

In a further embodiment, the second holding device may be in the form of a printed circuit board. If the second holding device is in the form of a printed circuit board, said printed circuit board may, for better distinction, be referred to as a second printed circuit board. For better distinction, it is preferable for the printed circuit board of the first holding device to be correspondingly referred to as a first printed circuit board. The first printed circuit board and the second printed circuit board may preferably be of identical form. The first printed circuit board and the second printed circuit board may alternatively be of different form.

The statements made in conjunction with the first printed circuit board apply analogously to the second printed circuit board. This thus means in particular that the second printed circuit board may preferably have the corresponding features.

Within the context of the present invention, a linear motor corresponds in particular to a linear embodiment of a rotary machine, having an energizable primary part, similar to a stator of a rotary motor, and having a secondary part, corresponding to a rotor of the rotary motor. In the light of these statements, the magnetic field generator may be referred to as the primary part. The reaction part, in particular the further magnetic field generator, may be referred to as the secondary part. In the case of linear motors, it is possible in particular to make a distinction between asynchronous and synchronous motors, wherein in the case of the asynchronous type of construction, the secondary part is fitted with short-circuit rods, whereas in the case of the synchronous motor, said secondary part is composed of permanent magnets. Synchronous motors have the advantage in particular that they exhibit high efficiency and high continuous thrust forces. Within the context of the invention, linear motors may be used in particular for generating translatory thrust movements. In the light of the statements made above, the stator device and the reaction part form a linear motor.

In the light of the statements above, a core of a coil may also be referred to as a stator tooth. The cores or stator teeth about which the coils can be wound may for example be of identical or different form. A stator tooth about which a coil is wound may preferably be referred to as a wound stator tooth. A stator tooth about which no coil is wound may preferably be referred to as a non-wound stator tooth.

In another embodiment, the first holding device may have a first cutout in which a first holding section of the magnetic field generator is inserted and fixed. This thus means in particular that the first holding section of the magnetic field generator is fixed so as to be inserted in the first cutout. This thus means in particular that the first holding section is inserted into the first cutout and subsequently or simultaneously fixed. It is preferably possible for a form-fitting and/or force-fitting or frictionally locking fixing to be provided. The fixing may preferably be realized by means of adhesive bonding and/or welding and/or encapsulation.

In one embodiment, the magnetic field generator may comprise a stator tooth and a coil wound around the stator tooth, with the first holding section being formed on a first end of the stator tooth. This thus means in particular that the stator tooth is, at a first end, inserted into and fixed in the first cutout of the first holding device. This embodiment has the advantage in particular that, in this way, particularly simple mounting of a coil with a core on the holding device, preferably on the printed circuit board, is made possible. It is preferably possible for the non-wound core or the non-wound stator tooth, at the first end thereof, to be inserted into and fixed in the first cutout. Subsequently, it may for example be provided that the coil is wound around the still non-wound core or stator tooth. The formation of a coil by winding a coil wire around a core is thus advantageously simplified considerably. In particular, it is thus advantageously possible to realize a copper fill factor of the coil of greater than 60%. It may preferably be provided that a pre-wound coil is pushed onto the stator tooth, or the stator tooth is pushed into a pre-wound coil. It is preferable for a coil wire to be wound directly around the stator tooth; in particular, for this purpose, use is made of a self-bonding wire, wherein the direct winding advantageously yields high mechanical strength between the coil and stator tooth. Furthermore, an achievable fill factor, in particular a copper fill factor, is improved yet further. The stator tooth that is fully wound in this way is then preferably inserted into the cutout.

In a further embodiment, the second holding device may have a second cutout in which a second holding section of the magnetic field generator is inserted and fixed. The statements made in conjunction with the first holding section of the magnetic field generator apply analogously to the second holding section.

In a further embodiment, the second holding section may be formed on a second end, which is situated opposite the first end, of the stator tooth. This thus means in particular that the stator tooth or the core of the coil is inserted into and fixed in respect of cutouts of the two holding devices. The corresponding statements regarding the first end of the stator tooth apply analogously to the second end of the stator tooth. It is preferable for the structural unit formed from the stator tooth, the coil and the holding devices to be fixed by means of encapsulation, which additionally leads to increased strength of the structural unit.

In another embodiment, it may be provided that multiple magnetic field generators which are spaced apart from one another are formed, wherein, between two magnetic field generators, there is provided in each case one non-wound stator tooth which, at a respective one of two opposite ends of the stator tooth, is inserted into and fixed in a respective cutout of the two holding devices. Through the provision of a non-wound stator tooth between two magnetic field generators, in particular between two wound stator teeth, it is advantageously possible in particular to realize a reduction of harmonics in electromagnetic force vectors.

In an alternative embodiment, multiple magnetic field generators which are spaced apart from one another may be formed, with in each case only a gap, in particular a minimal gap, being formed between two magnetic field generators. As a result of the direct lining-up of the magnetic field generators, the drive force generated by means of the magnetic field generators can advantageously be increased.

In a further embodiment, the first holding device, for example the printed circuit board, has multiple first cutouts. Cutouts of the first holding device may generally also be referred to in particular as first cutouts. It may preferably be provided that a first holding section, in particular a stator tooth, about which in each case one coil is wound, is inserted into every second first cutout. It may preferably be provided that, between two such wound stator teeth, a non-wound stator tooth is inserted into and fixed in the correspondingly free first cutout. Through the provision of multiple cutouts, it is in particular advantageously possible for a travel path for the vehicle to be formed, along which said vehicle can be displaced. The first cutouts may be arranged so as to run linearly. This thus means in particular that a linear travel path is advantageously thereby formed. The first cutouts may preferably be arranged so as to run with a curvature. This thus means in particular that the first cutouts are arranged along a curve with a curvature. It is preferably possible for the first cutouts to be arranged along a section of a circular arc. In particular, the first cutouts may be arranged along a clothoid. A clothoid is in particular a curve in which a radius at the beginning is greater than a mean radius and a radius at a later point is smaller than a mean radius. This thus means in particular that a curvature profile of the clothoid increases linearly. Jerk-free travelling dynamics of the vehicle are thus advantageously realized.

In a further embodiment, the second holding device may have multiple second cutouts. Cutouts of the second holding device may generally also be referred to as second cutouts. It may preferably be provided that a second holding section of a magnetic field generator is inserted into and fixed in every second one of the second cutouts. It is preferably possible for a non-wound stator core to be inserted into and fixed in the interposed second cutout. The corresponding statements made with regard to the first holding device with the first cutouts apply analogously to the second holding device with the second cutouts.

In another embodiment, the holding device, which is for example advantageously in the form of a printed circuit board, may have power electronics for the activation of the magnetic field generator. In this way, it is advantageously possible for a corresponding installation space to be utilized particularly efficiently in that, in this case, the power electronics can be fastened directly to the holding device. It may preferably be provided that the power electronics are embedded in the holding device so as to be advantageously protected against external influences. The provision of power electronics on or in the holding device has the advantage in particular that corresponding signal paths between the power electronics and the conductor tracks or the magnetic field generator can be designed to be short, such that corresponding signal losses are reduced. Furthermore, an installation space is advantageously reduced in size.

In another embodiment, a parameter memory may be provided for activation parameters of the magnetic field generator. This thus means in particular that activation parameters of the magnetic field generator can be or are stored in the parameter memory. Within the context of the present invention, activation parameters refer in particular to parameters with the aid of which the magnetic field generator can be activated. Within the context of the present invention, activation parameters may include in particular a defined current profile, in particular a local current profile, or a local relationship between current and thrust force or force constant of the motor. This thus means in particular that an activation of the magnetic field generator can be effected in an advantageous manner by means of the activation parameter. Said activation parameters may preferably be read out during operation, for example by means of electronics, in particular the power electronics, in order for the magnetic field generator to be operated correspondingly. It is preferable for the parameter memory to be arranged on or in the holding device, in particular on or in the first or second holding device. In particular, it is also possible for multiple parameter memories to be provided, such that redundancy in the event of failure is advantageously established.

In another embodiment, a thermal energy dissipater for dissipating thermal energy generated by means of the magnetic field generator during operation may be formed. Overheating of the magnetic field generator is advantageously prevented in this way. The thermal energy dissipater may for example be an energy dissipater that can be cooled by means of a fluid, that is to say in particular by means of a liquid and/or a gas. The energy dissipater may preferably be in the form of a profile element, in particular in the form of a solid profile element. Such a profile element may be arranged in the direct vicinity of the magnetic field generator such that, owing to the adequately small distance, adequate thermal coupling between the magnetic field generator and the profile element can be realized, such that thermal energy can be dissipated in an efficient and effective manner. In particular, if the magnetic field generator has electrical insulation, it is possible in said region for the thermal energy dissipater to be placed in direct contact with, that is to say connected directly to, the magnetic field generator, such that even more effective and efficient dissipation of thermal energy is made possible. It is preferable for the two holding devices to have corresponding holes for through bores in order in particular for a corresponding screw connection to the energy dissipater, preferably the profile element, to be realized.

In another embodiment, a supporting profile element may be formed between the two holding devices, wherein the two holding devices are fastened to the supporting profile element. In this way, mechanical stabilization of the stator device is advantageously realized if the two holding devices can be supported on the supporting profile element. Said supporting profile element can in particular advantageously absorb mechanical loads that act on the two holding devices, and thus advantageously prevent damage to the two holding devices. Such damage may for example be caused by excessively intense bending of the holding devices. Fastening may be realized in particular by means of adhesive bonding and/or by means of screws and/or by means of rivets and/or by means of welding and/or by means of nails and/or by means of clamping. It is preferable for the two holding devices to have corresponding holes for through bores in particular for the realization of a corresponding screw connection to the supporting profile element. In particular if the magnetic field generator is encapsulated or if fixing is realized by means of encapsulation, the hardened encapsulation between profile, holding device and wound and non-wound, that is to say unwound stator tooth generates high mechanical stability or contributes to stability.

In another embodiment, a mounting device for the fastening of a guide for guiding a vehicle may be formed. Such a guide may for example be in the form of a rail, which can guide a roller-guided vehicle, for example. The vehicle may preferably additionally or alternatively be fluid-guided, that is to say in particular air-guided, and/or magnet-guided. Through the provision of a mounting device, it is advantageously possible for different guides to be used depending on the application. Said guides can then advantageously be fastened to the mounting device in a simple manner. The mounting device may preferably be formed integrally with the supporting profile element. This thus means in particular that the mounting device and the supporting profile element are formed as one component. The mounting device, in particular the supporting profile element, has in particular one or more bores and/or receptacles to which, for example, the guide can be fastened or screwed. In particular, the guide may be adhesively bonded to the supporting profile element.

In one embodiment, it may be provided that a surface of the mounting device is covered by means of a protective layer. A protective layer may for example be a high-grade steel foil. A thickness of a protective layer may for example be approximately 50 μm. A thickness of the protective layer may preferably be between 1 μm and 300 μm. In particular, the thickness of the protective layer may be less than 250 μm, in particular less than 200 μm, preferably less than 150 μm, for example less than 100 μm, for example less than 50 μm. The exact thickness of the protective layer is dependent in particular on the frequencies of an alternating magnetic field of the magnetic field generator. Here, it must generally be ensured in particular that, corresponding to the frequencies used, the protective layer is thin enough that no eddy-current losses or only low eddy-current losses can arise therein. This thus means in particular that, although the magnetic field penetrates through the protective layer, it does not cause any remagnetization or eddy-current losses therein. Eddy-current losses may generally also be prevented by virtue of the protective layer being formed from a plastic. Said plastic may in particular be a foodstuff-compatible and/or pharmaceutically compatible plastic. Such a plastic is in particular legally approved for use in the foodstuff and/or pharmaceutical sectors. In general, the protective layer is designed for use in a pharmaceutical sector and/or a foodstuff sector. Through the provision of a protective layer, the holding device is advantageously protected against external influences, for example dirt. Furthermore, the protective layer can advantageously be cleaned in a particularly simple manner, such that for example legal hygiene requirements can be met. In particular if the surface of the holding device has no electrical contacts and/or conductor tracks, the protective layer may be arranged directly on the corresponding surface. If the corresponding surface has contacts and/or electrical conductor tracks, it is possible in particular for an insulation layer to be applied between the protective layer and the corresponding surface, such that in particular, electrical short-circuits can advantageously be prevented.

In one embodiment, the support may have two opposite end regions, with a central region being formed which is formed between the two end regions. It is preferable for in each case one permanent magnet or multiple permanent magnets to be formed in the end regions and in the central region. It is preferable for a number of the permanent magnets in the end regions to differ from a number of permanent magnets in the central region. If such a support is arranged opposite a stator device comprising multiple magnetic field generators, the permanent magnets of the central region generate a thrust force owing to corresponding magnetic interaction with the oppositely arranged magnetic field generators. Said thrust force will then advantageously displace the support. The permanent magnets of the end regions likewise interact with the correspondingly oppositely arranged magnetic field generators, such that here, with corresponding energization of the magnetic field generators, a repelling force is generated which causes magnetic suspension of the support relative to the stator device. This advantageously has the effect that a guide that guides a vehicle, in particular by means of running rollers, if the vehicle is fastened to the carrier, is mechanically relieved of load. Wear of running rollers can thus advantageously be prevented or reduced.

It is preferable for in each case one intermediate region which has no permanent magnets to be formed between the end regions and the central region. Said intermediate region is thus in particular formed without magnets. In this way, an undesired magnetic interaction of the permanent magnets of the central region with magnetic field generators arranged between the permanent magnets of the end region is advantageously prevented. Conversely, it is advantageously thus also the case in particular that corresponding magnetic interaction between the permanent magnets of the end regions and the magnetic field generators situated between the permanent magnets of the central region is prevented. A distance between the central region and an end region is preferably greater than or equal to a diameter of the magnetic field generator, in particular of a coil.

In a further embodiment, the guide may have a cross-sectional shape with two opposite constrictions. This thus means in particular that, in a cross-sectional view, the guide has in each case one opposing constriction on two opposite sides. In this respect, the guide is in the shape of an hourglass. In this way, it is advantageously possible for a running roller to rest in said constriction and be guided in said constriction. It is preferable here for multiple running rollers to be provided which are arranged one behind the other.

The invention claimed is:

1. A stator device for a linear motor, comprising:
   an electrically energizable magnetic field generator for forming a magnetic field; and
   a first holding device for holding the magnetic field generator;
   wherein the magnetic field generator is fastened to the first holding device, wherein the first holding device is formed at least partially from any of an electrically and magnetically non-conductive material;
   wherein the magnetic field generator comprises a coil and a stator tooth as a core around which the coil is wound; and wherein the first holding device is in the form of a printed circuit board for electrical contacting of the magnetic field generator, the printed circuit being subdivided into a first section and a second section by a profile element fastened to the printed circuit board,
  wherein in the first section of the printed circuit board the stator tooth is fastened to the printed circuit board, and an end of the coil wound around the stator tooth is electrically connected to the printed circuit board, and
  wherein in the second section of the printed circuit board power electronics are electrically connected to the printed circuit board, the power electronics electrically energizing the coil of the magnetic field generator via the printed circuit board.

2. The stator device as claimed in claim 1, wherein a second holding device for holding the magnetic field generator is formed, to which second holding device the magnetic field generator is fastened, wherein the magnetic field generator is arranged between the two holding devices.

3. The stator device as claimed in claim 2, wherein the first holding device and the second holding device have, respectively, a first cutout and a second cutout into which a first holding section and a second holding section respectively of the magnetic field generator are inserted and fixed.

4. The stator device as claimed in claim 3, wherein a first holding section is formed on a first end, and a second holding section is formed on a second end, of the stator tooth.

5. The stator device as claimed in claim 1, wherein multiple magnetic field generators which are spaced apart from one another are formed, and wherein in each case one non-wound stator tooth is provided between two magnetic field generators.

6. The stator device as claimed in claim 1, wherein multiple magnetic field generators which are spaced apart from one another are formed, and wherein a gap is formed in each case between two magnetic field generators.

7. The stator device as claimed in claim 2, wherein the second holding device is in the form of a printed circuit board for electrical contacting of the magnetic field generator.

8. The stator device as claimed in claim 1, wherein the material of the printed circuit board is a fiber-reinforced plastic.

9. The stator device as claimed in claim 1, wherein the first holding device has power electronics for the activation of the magnetic field generator.

10. The stator device as claimed in claim 1, wherein a parameter memory is provided for activation parameters of the magnetic field generator.

11. The stator device as claimed in claim 1, wherein a thermal energy dissipater for dissipating thermal energy generated by means of the magnetic field generator during operation is formed.

12. The stator device as claimed in claim 2, wherein a supporting profile element is formed between the two holding devices, wherein the two holding devices are fastened to the supporting profile element.

13. The stator device as claimed in claim 1, wherein a mounting device for the fastening of a guide for guiding a vehicle is formed.

14. A stator device for a linear motor, comprising:
an electrically energizable magnetic field generator for forming a magnetic field; and
a first holding device for holding the magnetic field generator;
wherein the magnetic field generator is fastened to the first holding device, wherein the first holding device is formed at least partially from any of an electrically and magnetically non-conductive material;
wherein the magnetic field generator comprises a coil and a stator tooth as a core around which the coil is wound; and
wherein the first holding device is in the form of a printed circuit board for electrical contacting of the magnetic field generator, the printed circuit board projecting into a carrier profile element, wherein a power electronics system is directly fastened to the first holding device, and wherein the power electronics system is arranged in an installation space in the carrier profile element.

15. A stator device for a linear motor, comprising:
an electrically energizable magnetic field generator for forming a magnetic field; and
a first holding device for holding the magnetic field generator;
wherein the first holding device is in the form of a printed circuit board for electrical contacting of the magnetic field generator, the printed circuit board projecting into a carrier profile element, wherein a power electronics system is directly fastened to the first holding device, and wherein the power electronics system is arranged in an installation space in the carrier profile element.

* * * * *